United States Patent [19]

Ramsden

[11] Patent Number: 5,481,464

[45] Date of Patent: * Jan. 2, 1996

[54] SYSTEM FOR COLLECTING AND SHIPPING ITEMS

[75] Inventor: Gary W. Ramsden, Eau Claire, Wis.

[73] Assignee: U-Ship, Inc., Edina, Minn.

[*] Notice: The portion of the term of this patent subsequent to Aug. 3, 2010, has been disclaimed.

[21] Appl. No.: 198,872

[22] Filed: Feb. 18, 1994

Related U.S. Application Data

[63] Continuation-in-part of Ser. No. 903,342, Jun. 24, 1992, Pat. No. 5,340,948, which is a continuation-in-part of Ser. No. 683,243, Apr. 10, 1991, Pat. No. 5,233,532.

[51] Int. Cl.⁶ .................................................. G07B 17/00
[52] U.S. Cl. ................... 364/464.03; 235/375; 235/380
[58] Field of Search .................................... 235/375, 380; 364/464.02, 464.03

[56] References Cited

U.S. PATENT DOCUMENTS

| | | | |
|---|---|---|---|
| 3,290,491 | 12/1966 | Wahlberg | 364/464.03 |
| 4,901,241 | 2/1990 | Schneck | 364/464.02 |
| 5,233,532 | 8/1993 | Ramsden | 364/464.02 |
| 5,340,948 | 8/1994 | Ramsden | 364/464.03 X |
| 5,365,044 | 11/1994 | Hesshaus | 235/375 |

*Primary Examiner*—Edward R. Cosimano
*Attorney, Agent, or Firm*—Woodcock, Washburn, Kurtz, Mackiewicz & Norris

[57] ABSTRACT

Disclosed is an integrated, automated, unattended unit for collecting and securely holding items for collection and shipment by commercial delivery services, the unit including a scale for weighing the item to be shipped, a computer for inputting information relating to the destination to which the item is to be shipped and for analyzing the inputted information including calculating the fee for shipment of the item, a card reader for receiving bank credit card information and for communicating and assessing the shipment fee to the account of the person, and secured storage, the computer being adapted for communicating the shipment fee by telephone lines.

34 Claims, 10 Drawing Sheets

SYSTEM FOR COLLECTING AND SHIPPING ITEMS

This is a Continuation-in-part of application Ser. No. 07/903,342, filed on Jun. 24, 1992, now U.S. Pat. No. 5,340,948, which was a Continuation-in-part of application Ser. No. 07/683,243, filed on Apr. 10, 1991, now U.S. Pat. No. 5,233,532.

BACKGROUND OF THE INVENTION

1. Field of the Invention

This invention relates to the commercial shipping and delivering industry. More specifically, this invention relates to an automated, unattended unit for collecting and holding parcels, letters and other items for one or more commercial delivery services.

2. Description of the Prior Art

Individuals and companies rely heavily on commercial delivery services to transport letters and packages to intended addresses and recipients throughout the world. Commercial delivery services compete intensely both in terms of pricing and service. The amount of time that it takes a commercial delivery service to deliver an item to its destination is critical to the shipment of many items. To meet this demand, many commercial delivery services offer an overnight or "next-day mail" service for a premium price. Price competition for overnight and other service is very intense, and it is particularly important that shipped items be collected, transported and distributed quickly and on a cost-effective basis.

Some delivery services operate unattended drop-boxes in which a customer may place a pre-addressed package or letter. This is done with specialized envelopes which are distributed by the delivery service; often such envelopes include an account number for the customer and a tear-off receipt that the customer may keep after mailing the package. Such schemes, however, cannot provide full insurance protection or verification that the package was in fact mailed, since no attendant is present to verify that the letter was actually placed in the box. In addition, present-day unattended drop-boxes generally are not suitable for accepting packages because packages need to be pre-weighed and sized before they can be accepted for shipment.

Another disadvantage of unattended drop-boxes is that they are generally inaccessible to customers who do not have a preassigned customer account or specialized mailing envelope. Such systems are also necessarily limited in the size and shape of items that they will accept for shipment.

Most delivery services also operate staffed offices in large towns and cities which can accept items of most sizes for shipments, and give verified receipts to the customer. Such offices can generally be used by persons who do not have a special account number with the company, but are usually limited in hours of operation. Such offices have a relatively high overhead cost. This limits the number of such offices that a company is willing to maintain. As a result, many persons and companies seeking overnight or other expedited delivery service must either drive to the nearest office, which might be many miles away, or if feasible, use a drop-box which does not give a verified deposit receipt.

Clearly a long and unfilled need in the art has existed for a system which accepts and stores items for subsequent pickup by a commercial carrier which is inexpensive to maintain and service, which gives a verified deposit of receipt, which accepts items of different sizes and shapes for shipment, and which can be accessed by persons and companies who do not have a preexisting relationship with the delivery service or services.

SUMMARY OF THE INVENTION

Accordingly, it is an object of this invention to provide a system which can accept and store items for subsequent pickup by a commercial carrier.

It is further an object of this invention to provide such a system which is inexpensive to deploy and maintain at a fixed location.

It is yet further an object of this invention to provide such a system, which can accept letters and packages of different shapes and sizes, and size and weigh shipments prior to acceptance.

It is further an object of the invention to provide a system for accepting and storing items for shipment by a commercial carrier which is accessible to persons and companies who do not have a preexisting business relationship with the carrier or carriers.

It is further an object of the invention to provide a system for accepting and storing items for subsequent pickup by a commercial carrier which can give a verified deposit of receipt to a customer.

Furthermore, it is an object of the invention to provide a system for accepting and storing items for subsequent pickup which can be used and operated by several different, competing, commercial delivery services.

In order to achieve the above and other objects of the invention, a system for accepting and storing parcel packages, according to a first aspect of the invention, for subsequent pickup by a commercial carrier includes an outer housing having inner and outer surfaces, the inner surface defining a storage area which is constructed and sized to store a multiplicity of parcels: a scale, accessible from outside the outer surface of the outer housing, for weighing a parcel which a customer intends to ship; a keyboard, also accessible from outside said outer surface of said outer housing, for inputting information relating to the destination of the parcel from the customer; a controller for calculating a shipment fee for the parcel, the controller being in communication with the scale and the keyboard; payment structure, in communication with the controller, for accepting payment identity information from the customer, e.g. a bank card; deposit structure, enabled by the controller, for permitting a customer to securely deposit the parcel into the storage area, whereby the volume within the storage space is utilized more efficiently for storing the parcels then would otherwise be possible.

A system for accepting and storing parcel packages for subsequent pickup by a commercial carrier includes, according to a second aspect of the invention, an outer housing having inner and outer surfaces, the inner surface defining a storage area which is constructed and sized to store a multiplicity of parcels; a scale, accessible from outside the outer surface of the outer housing, for weighing a parcel which a customer intends to ship; a keyboard, also accessible from outside the outer surface of the outer housing, for inputting information relating to the destination of the parcel from the customer; control structure for calculating a shipment fee for the parcel, the control structure being in communication with the scale and the keyboard; payment structure, in communication with the control structure, for accepting payment identity information from the customer; deposit structure, enabled by the control structure, for permitting a customer to securely deposit the parcel into the storage area; and climate control structure for maintaining the storage area at a safe temperature which will not damage the parcel.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
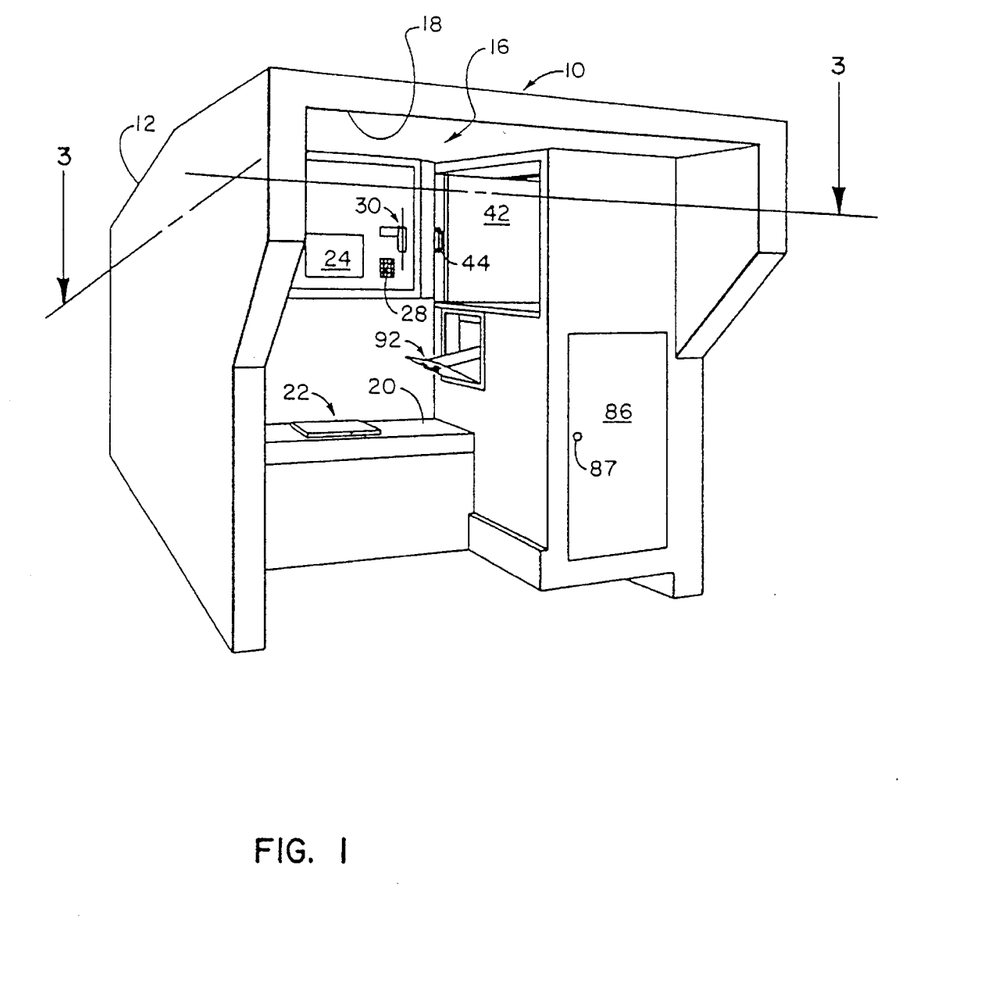
FIG. 1 is a perspective view of a system constructed according to a first preferred embodiment of the invention.
Figure 2:
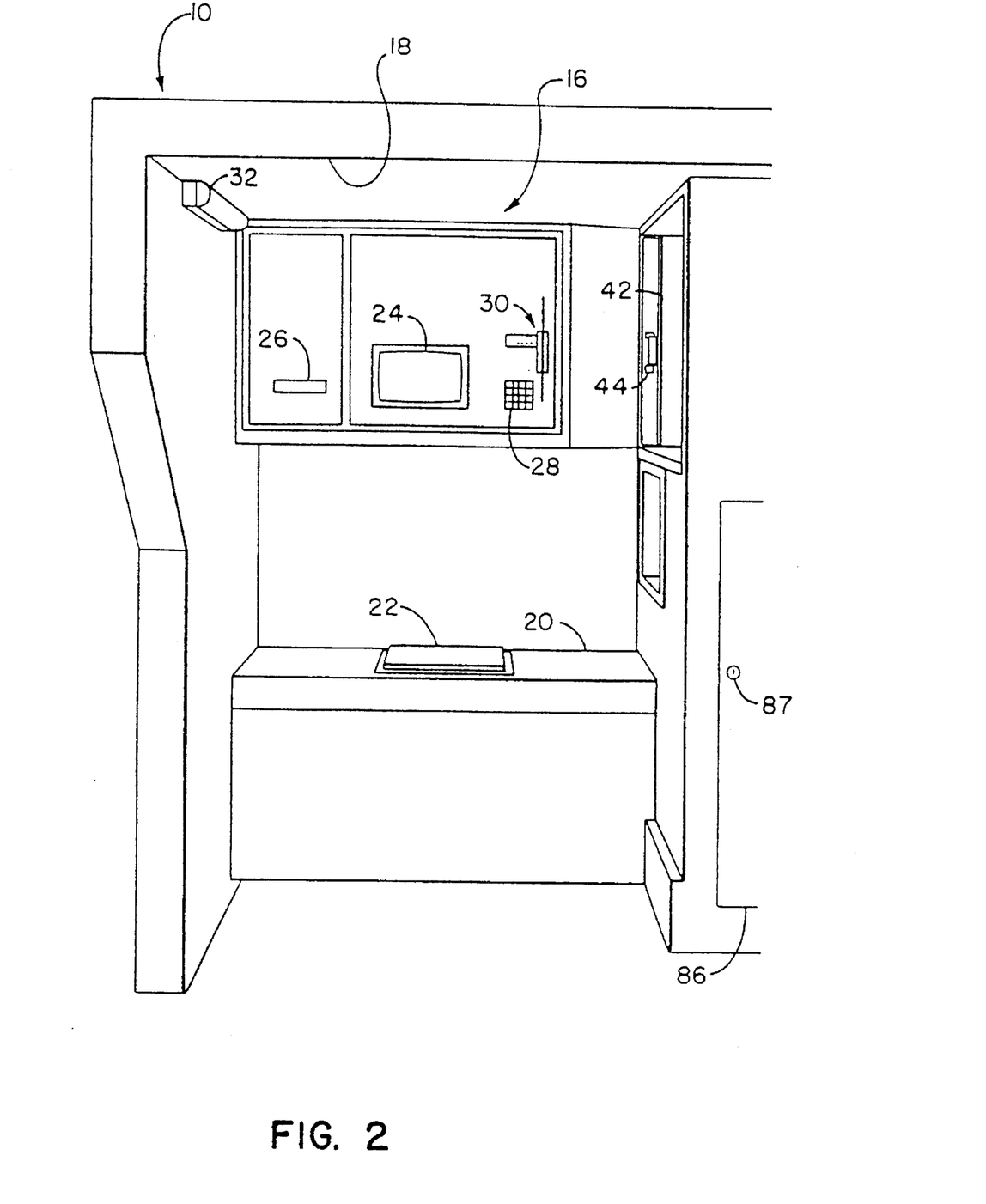
FIG. 2 is a partial front elevational view of the system which is illustrated in FIG. 1.

Referring now to the drawings, wherein like reference numerals designate corresponding structure throughout the views, and referring in particular to FIGS. 1–4, a system 10, constructed according to a first embodiment of the invention for accepting and storing items for subsequent pickup by a commercial carrier includes an outer housing 12 which defines a storage area 14 for holding items such as packages or parcels. The outer housing 12 may include enviromentally controlled, for example resistant hearing may be provided in the walls to avoid freezing of any items placed in the housing 12. As best shown in FIGS. 1 and 2, system 10 further includes a customer interface area 16 which is positioned beneath a hooded overhang 18. Hooded overhang 18 provides privacy and shelter from the elements to a customer during use of the system 10. Interface area 16 includes a horizontal platform 20 upon which packages, parcels or personal items can be placed by a customer. Measuring indicia (not shown) area also preferably printed on platform 20 and on adjacent vertical walls of the housing 12 so that a customer can quickly measure the external dimensions of the item he or she intends to ship.

An electronic scale 22 is provided on platform 20 for weighing an envelope, parcel or package prior to its mailing, as will be described in greater detail below. Customer interface area 16 further includes a CRT video display terminal 24, a printer 26, a key pad 28 and a magnetic card reader 30, for purposes which will be described in greater detail below. A lamp 32 is provided on an underside of the hooded overhang 18 to provide illumination to the customer interface area 16, as may be seen in FIG. 2.

Figure 3:
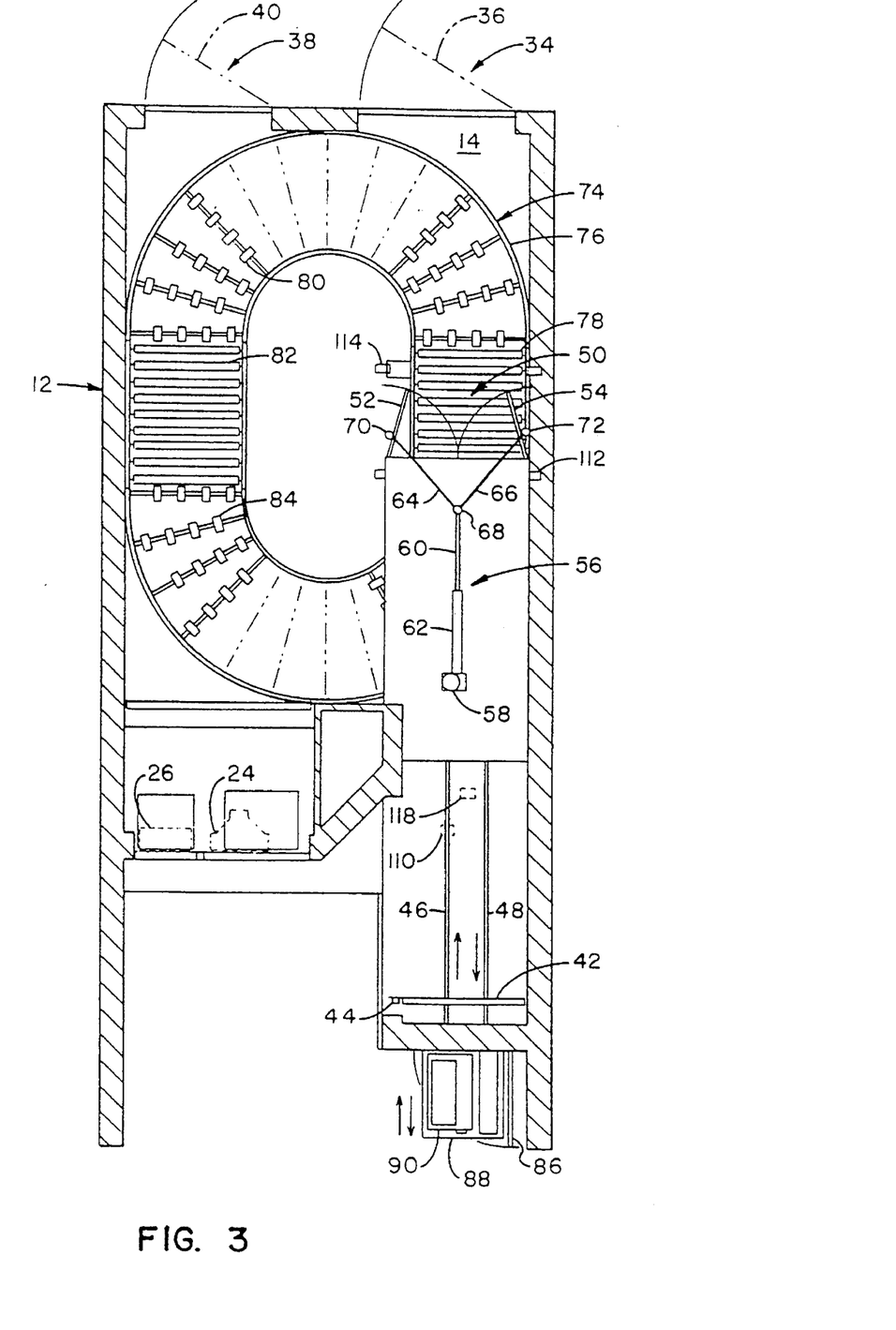
FIG. 3 is a top sectional view taken generally along lines 3—3 in FIG. 1.

Referring now to FIG. 3, a back wall of outer housing 12 has a first service access opening 34 defined therein which is selectively openable and closable by a first door 36. First door 36 includes a key-type lock (not shown) which, desirably, can be opened only by service personnel or representatives of client delivery services. A second service access opening 38 is also defined in the back wall of outer housing 12 and is accessible via a second door 40. Second door 40 is also provided with a key-type lock (not shown) which, preferably, is also openable only by service personnel or representatives of client delivery services. The purpose of first door 36 and second door 40 during operation of the system 10 will be discussed in greater detail below.

Referring now to FIGS. 1 and 3, an outer door 42 having a handle 44 is positioned to the upper right of the customer interface area 16. Outer door 42 is mounted for linear movement in a horizontal plane by a pair of linear bearings which include a first guide track 46 and a second guide track 48. The guide tracks 46, 48 extend flush with or beneath a smooth horizontal surface upon which a package or parcel may be placed.

To prevent unauthorized access to storage area 14, a security mechanism 50 includes a pair of inner doors 52, 54 which are openable and closable by an inner door closing mechanism 56. Closing mechanism 56 includes a stepper motor 58 which is arranged to extend and retract an extendable member 60 through a suitable mechanical transmission arrangement, such as a pinion and rack arrangement. Extendable member 60 is slidably received within a casing 62, as may be seen in FIG. 3. A first link 64 and a second link 66 are pivotally connected to a distal end of extendable member 60 at a pivot point 68, as may further be seen in FIG. 3. Second, opposite ends of the first and second links 64, 66 are connected to the first and second inner doors 52, 54 at pivot points 70, 72, respectively.

When stepper motor 58 is operated in a first rotary direction, extendable member 60 will extend out of casing 62, opening the inner doors 52, 54. When stepper motor 58 is caused to rotate in a second, opposite directions, extendable member 60 will retract into casing 62, thereby closing the inner doors 52, 54. A more detailed description of the function of security doors 50 within the overall context of system operation is provided hereinbelow.

Referring again to FIG. 3, a guide structure 74 is provided for guiding an item such as package or parcel from the rearwardmost end of the guide tracks 46, 48 to a deposit area on the floor of storage area 14. In the preferred embodiment, guide structure 74 is constructed as spiral guide track 76, which includes an alternating series of high speed and slow roller sections. The guide track 76 may include a scale for weighing the item as the item travels along the track. As shown in FIG. 3, guide track 76 includes a first set of slow rollers 78, which are positioned at the uppermost, initial approach area of the guide track 76. The entire guide track 76 inclines downwardly throughout both the curved and straight areas, so that a package or parcel placed thereon will roll under its own weight to the bottom of track 76 at the deposit area near the floor of storage area 14. It should be made .clear that the first set 78 of slow rollers extends beneath inner door closing mechanism 56 to the rearwardmost end of guide tracks 46, 48, so that a package or parcel placed behind outer door 42 is moved to its rearward, closed position. At this point, only the security doors 50 will stop the package or parcel from rolling unimpeded along the guide track 76, and only if the doors 52, 54 are in their closed position.

Guide track 76 includes a high speed curved roller area 80 at the lower end of the first set 78 of slow rollers which will allow the parcel or package to travel at a higher speed than the parcel or package traveled on the slow roller set 78. A second section 82 of slow rollers are provided at the lower end of first high speed roller section 80 to keep the parcel or package from attaining too high of a speed. A second high speed roller section 84 is provided at the lower end of second slow roller section 82. A third slow roller section (not shown) is positioned at the lower end of second high speed roller section 84 to slow the package or parcel as it approaches the deposit area near the floor of storage area 14. The guide track 76 terminates near the floor of storage area 14, at a point which is adjacent to the first service access opening 34. As a result, service personnel or representatives of client delivery services can retrieve parcels or packages from storage area 14 conveniently by unlocking and opening first door 36.

Figure 4:
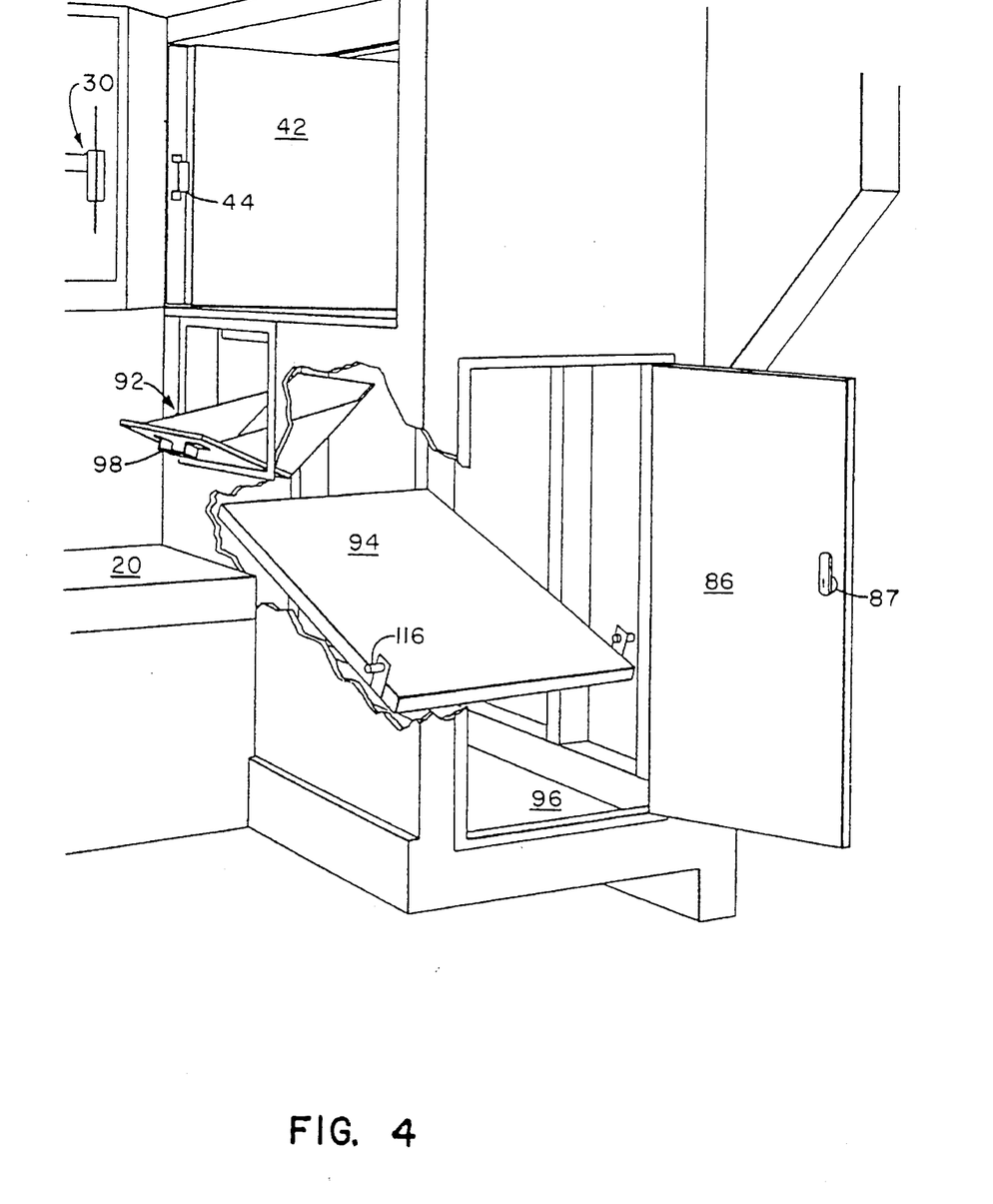
FIG. 4 is a perspective fragmentary view of a portion of the system which is illustrated in FIGS. 1–3.

Referring now to FIGS. 1, 3 and 4, a manifest access door 86 is provided in a forward wall of outer housing 12, immediately to the right of customer interface area 16. Manifest access door 86 is provided with a lock 87 which is, preferably, openable only by service personnel or representatives of client delivery services. A manifest printer 90 is provided on an upper surface of a platform 88 which is slidably mounted on bearings so as to be extendable from the outer housing 12 when the manifest access door 86 is opened. The purpose of manifest printer 90 will be discussed in greater detail below.

Looking now to FIG. 4, system 10 further includes a dump drop option for the mailing of small envelopes and similar items. Dump drop 92 includes a pivotable door or drawer which has a handle 98 and is similar to the drawers on commercial drop-boxes or those which are used by the U.S. Postal Service. If desired, the drawer 92 may include a scale on which items may be weighed as they are placed in the drawer. Positioned beneath the pivotable drawer is an inclined low friction chute 94 which inclines downwardly to a location above a collection space 96. When an envelope is placed in the pivotable drawer of dump drop 92 and the drawer is allowed to pivot back to its closed position, an envelope will fall onto the incline chute 94 and slide downwardly, finally dropping into the collection space 96. Chute 94 is positioned beneath the slidable platform 88 for the manifest printer 90, which are not shown in FIG. 4 for purposes of clarity.

One important aspect of system 10 is the provision of a control system 100 which coordinates various sensors, motors, and input/output devices throughout the system. The control system 100 may include mechanism that recognizes voices and is adapted to be controlled by the spoken words. For example, the Name and address of the recipient may be inputted by vocalizing the name and address of the recipient. The control system may include mechanism for correcting spelling and the like, e.g. the key board. The control system 100 may further include recordings that are controlled to instruct the person using the system on the methods and steps of using the system.

Figure 5:
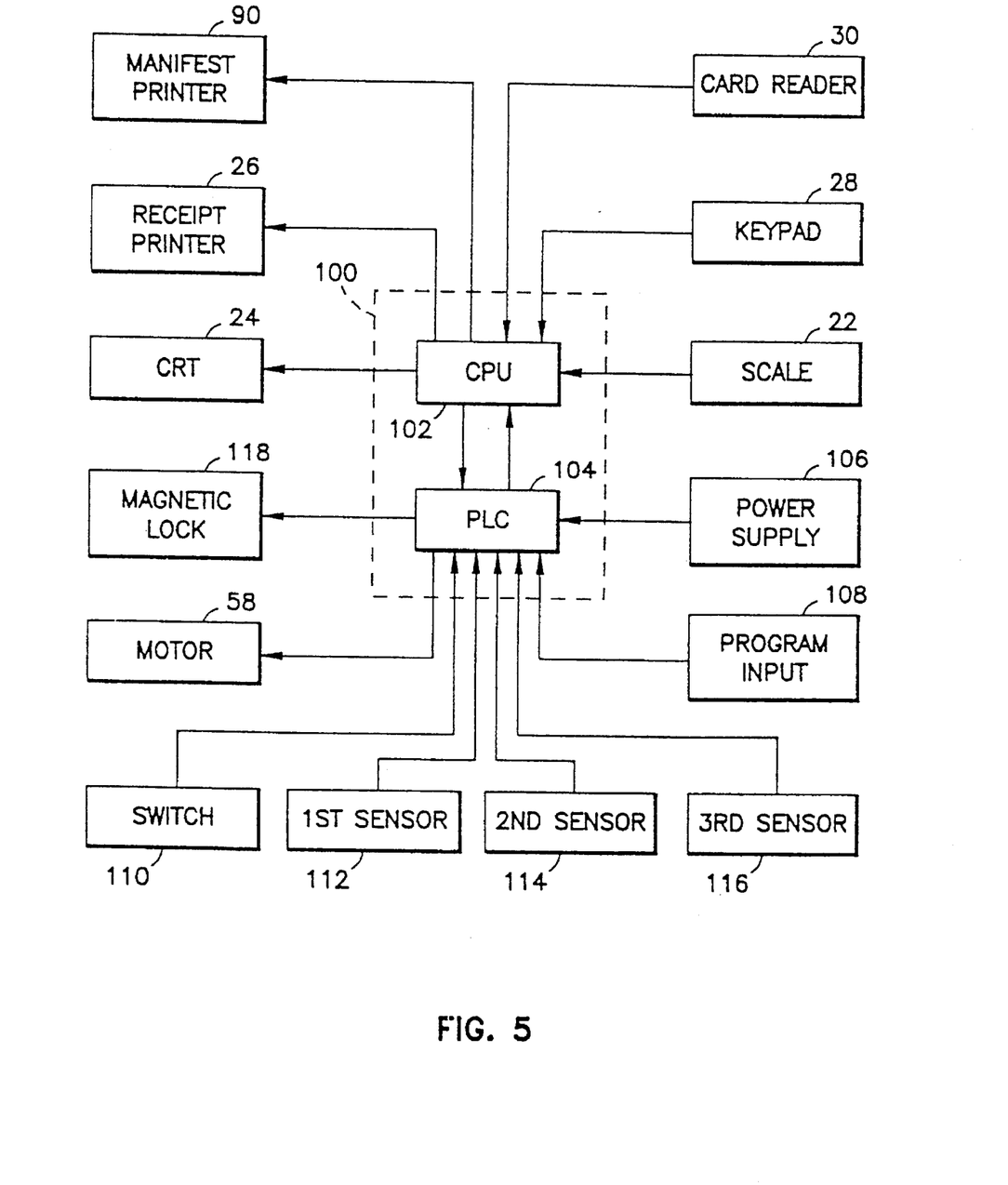
FIG. 5 is a schematic view of a control system for the embodiment of the invention illustrated in FIGS. 1–4.

Control system 100 is schematically illustrated in FIG. 5, and includes a central processing unit (CPU) 102 which is in two-way communication with a program logic controller (PLC) 104. Inputs to the CPU 102 include the electronic scale 22, the key pad 28, and the magnetic card reader 30, all of which are positioned in the customer interface area 16 that was described above. Outputs from the CPU 102 include the manifest printer 90, the printer 26 in the customer interface area 16, and the video display terminal 24.

The PLC 104 receives input and outputs to the CPU 102, as is schematically indicated in FIG. 5. Additionally, the PLC 104 directly receives input from a power supply 106, which provides power to the control system 100 and the various electrical components of the system 10. PLC 104 also receives input from a program input component, which in the preferred embodiment is a key board (not shown) provided in a panel behind the customer interface area 16. The PLC 104 is preferably a memory device which can receive programming input only from input device 108. PLC 104 also directly receives input from a two-position switch 110, which monitors the position of outer door 42 by reversing position each time outer door 42 passes over the sensor switch 110. The position of sensor switch 110 is indicated in FIG. 3 of the drawings, and preferably is approximately 12 inches from the rearwardmost end of the guide tracks 46, 48. PLC 104 also receives input from a second photocell sensor 114, which is also positioned slightly above guide track 76 at a location which is rearward or downstream from the security doors 50. A third photocell sensor 116 is provided at the bottom of the inclined chute 94 and the dump drop system 92 illustrated in FIG. 4. Third photocell monitor 116 further provides input to PLC 104.

In operation, the system 10 is deployed to a location which is considered convenient to potential customers. This may be a hotel lobby, a service station, a business establishment, or other location. Once positioned, control system 100 is programmed to interface with potential customers. To do this, a specialized programmer person uses program input device 108 to load the appropriate zone and weight charts for all client delivery services into the PLC 104. Next, the programmer loads the corresponding fee files which correspond to each client delivery service at that desired location. At this point in time, the system is ready to interact with potential customers.

First, a customer approaches the customer interface area 16. The customer measures the dimensions of the item being shipped on the indicia which is provided on or about platform 20. The video display terminal or screen 24 at this point displays a prompt which instructs the customer to place the envelope, parcel or package on electronic scale 22 and instructs the customer to push a start button on key pad 28 to initiate a deposit. Once control system 100 receives input from electronic scale 22 and the start button, it evaluates the input to check whether the package, parcel or envelope exceeds a predetermined weight maximum, which preferably is approximately 70 pounds. If the package exceeds the predetermined maximum, control system 100 displays a message on video display terminal 24 to the effect that the system cannot accept packages which exceed the predetermined maximum weight. If the package is within the predetermined weight maximum, control system 100 displays a prompt on video display terminal 24 which instructs the customer to pass a magnetic credit card through magnetic card reader 30.

System 10 may be compatible with at least one commercial bank card such as VISA or Master Card. If desired, system 10 is selectively compatible with several different commercial bank cards. After the customer has passed the magnetic card through reader 30, control system 100 evaluates the information received from card reader 30 and determines whether or not the card information meets certain predetermined characteristics. Those characteristics may be the type of card, the expiration date, and whether the card is listed in the CPU memory as a "bad" card. The reader 30 may be connected to a dedicated telephone line that communicates with a central location for processing charges on the bank card. The validation of the card may also be processed over the telephone line. If desired, the telephone line may include the capacity for verbal communication by the customer with an information source or service center concerning the operation of the system 10.

If the information read from the card does not meet the necessary criteria, the control system 100 may display a prompt on terminal 24 to pass the card through reader 30 a second time. If the card information is approved by system 100, system 100 may display a prompt on terminal 24 which asks for a phone number where the customer can normally be reached. After the customer enters a phone number through key pad 28, system 100 evaluates the number to see whether it meets predetermined criteria, such as whether the number is either seven or ten digits. If it does not, system 100 displays a second prompt on terminal 24 which asks the customer to reenter the number.

If the number meets the selected criteria, system 100 displays a screen which requests the customer to enter the desired zip code of the item which is to be mailed. The customer then enters the destination zip code through key pad 28, and the system 100 evaluates the code against certain criteria, such as whether exactly five digits have been entered. If the criteria are not met, a screen is displayed which instructs the customer to reenter the zip code. If the zip code that is entered by the customer meets the predetermined criteria, system 100 displays a screen on terminal 24 which instructs the customer to enter the value of the item that is being deposited. The customer then enters the value of the item through key pad 28. This information is evaluated by system 100 and compared with certain criteria, such as whether it exceeds a predetermined maximum. If the information does not meet the criteria, the system displays a screen on terminal 24 which instructs the customer to reenter the evaluation information.

If the entered value meets the criteria, system 100 will display a screen which instructs the customer to enter the size of the package. Once the customer enters the size of the package through key pad 28, the system will automatically re-weigh the package without informing the customer. If control system 100 determines that the weight of the package has changed since the original weighing, it will display a screen on terminal 24 which warns the customer against touching the package. At that point, control system 100 again re-weighs the package. Once a consistent weight reading is achieved, or if the package weight has remained unchanged since the original reading, system 100 will automatically calculate the charges that are to be applied to the credit or debit card account and will then display a screen on terminal 24 which requests the customer to enter the preferred mode of transportation for the item.

At this point, a menu of the fees different services would charge may appear, and the customer can specify which commercial delivery service he or she would like to use by entering the appropriate information through key pad 28. Once this information is received by system 100, system 100 will display a screen on terminal 24 which asks the customer whether the customer would like to change any previous entries. If the customer responds through key pad 28 in the affirmative, the system 100 will display a screen on terminal 24 which allows the customer to select which input the customer would like to change, and, upon entry of the appropriate information by the customer, will allow the customer to change previously-input data.

If the customer indicates that all of the previously-input information is still valid, or if all incorrect information has been reentered correctly, control system 100 will actuate printer 26 to print a mailing label for the package. Preferably, printer 26 is equipped with a peel-type laminated label material which can be peeled off to expose an adhesive backing. Once the label is printed, the customer peels the back away from the label, and places the label on the item that is to be mailed. At this point, control system 100 displays a screen on terminal 24 which instructs the customer to take the label from the printer, to write the mailing address onto the label, to place the label on the package, and to place the envelope or package in the appropriate door.

If, because of the previously-input information, control system 100 determines that the item to be mailed is an envelope, it instructs the customer to place the envelope into the dump drop 92. At this point, control system 100 will take no further action until it receives input from the third photoelectric sensor 116 that an envelope has indeed traveled down inclined chute 94 and into the collection space 96.

If, because of the previously-input information, control system 100 determines that a package or parcel is to be mailed, control system 100 will unlock a magnetic lock 118, which will permit the customer to slide outer door 42 to its forwardmost position by pulling on the handle 44. As the customer pulls the outer door 42 to its forward position, switch 110 will be actuated, thus verifying to control system 100 that outer door 44 has been opened. Once switch 110 is actuated, control system 100 will actuate stepper motor 58 to close the inner security doors 52, 54 in a manner that has been previously described.

At this point, the customer will place the parcel or package on the flat surface immediately to the rear of outer door 42. The customer will then push outer door 42 toward its closed position, thus pushing the parcel or package onto the first set 78 of slow rollers on the spiral guide track 76 and, in the process, returning the outer door position sensor switch 110 to its original position, which indicates to the control system 100 that the outer door has been closed. The parcel or package will be pushed into a temporary holding space between the outer door 42 and the security doors 50. The system 100 will then actuate magnetic lock 118 to ensure that the outer door 42 is completely closed. When the first sensor 112 (or the third sensor 116 in the case of the dump drop) senses the presence of an envelope, parcel or package, control system 100 stores information relating to the transaction in CPU 102.

Once the signal from switch 110 reaches the control system 100, system 100 will instruct stepper motor 58 to turn in a second direction, thereby opening the security doors 52, 54 in the previously described manner. At this point, the package or parcel rolls down the spiral guide track 76, and passes through the second photocell monitor 114. The package or parcel will continue to roll on guide track 76 to the deposit area near the floor of storage area 14. If the second monitor sensor 114 remains actuated, the control system 100 assumes that the storage area 14 is full, and the system 10 will no longer accept parcels or packages. If second monitor sensor 114 does not remain actuated, control system 100 displays a screen on terminal 24 asking the customer whether the customer would like to mail another item. If the customer responds in the affirmative, the entire process except for the phone number request and credit card check is repeated. If the customer replies in the negative, the control system 100 instructs printer 26 to print a verified deposit of receipt for the customer. At this point, the control system 100 will display a new screen on terminal 24 thanking the customer for his or her business. Alternatively this communication may be by prerecorded voice.

At any point in the process, the process is canceled after a certain amount of time if the customer does not respond to a screen, in case the customer decided to leave.

Control system 100 also provides a master control screen for use by maintenance personnel during servicing of the system. To cause the system 100 to display the master control screen on terminal 24, a maintenance person must enter a predetermined code into the key pad 28. A password must be entered and verified by the system 100. Once the password has been verified, control system 100 will display a screen on terminal 24 which presents the service person with four different options.

The first option is to return to the main program, which will terminate the master control screen. The second option is to print the package history log. If this option is selected, control system 100 will print the log of all packages which have been accepted by the system 10 on the manifest printer 90. At that point, the system 100 will display a second screen on terminal 24 asking whether the log printed satisfactorily. If an affirmative answer is received, the original four options are displayed on the screen. If the answer is negative, a screen is displayed which instructs the maintenance to align the paper and make sure the printer is on line. After a suitable amount of time, the system 100 will reprint the package log on manifest printer 90.

The third option that is presented in the master control screen is to print the credit card log. If this option is selected, the system 100 will print a log of all credit cards that have been used on the manifest printer 90. After printing, a screen asking whether the log printed satisfactorily will appear on terminal 24. If the answer is affirmative, the original four options will again be displayed. If the answer is negative, instructions regarding the alignment of the paper and on-line status of the printer are again displayed, and the process of printing the credit card log is then repeated by control system 100.

The fourth option available on the master control screen is to shut down the program altogether. If this option is selected, the system 10 is rendered inoperative.

Each commercial delivery service which contracts with the owner of the system 10 also has a screen provided for the use of its service personnel. To enter this mode, the delivery service person enters a predetermined password into the key pad 28. The system 100 verifies whether the password is correct, and, if it is correct, will display a screen which gives the delivery service person four different options that can be performed by the system 10. The first option is to return to the main program, which cancels the screen and returns the system to its customer interface mode. The second option is to print the manifest checkoff sheet which, if selected, will print a list of deposits which customers have selected for that particular delivery service in a sheet form which can be checked off by the delivery service person as the packages are retrieved through the first service access opening.

The system 10 may be capable of transmitting the manifest to a remote location such as a central office for the carrier.

At this point, system 100 displays a second screen on terminal 24 inquiring whether the checkoff sheet printed correctly. If the delivery service person responds negatively, a screen is printed which instructs the delivery person to align the paper and make sure that the printer is on line. System 100 then tries to reprint the checkoff sheet. If the delivery service person indicates that the checkoff sheet printed satisfactorily through key pad 28, the service person, who has previously opened manifest access door 86 to obtain access to the manifest printer 90, will open the first service access door 34 and retrieve the packages which have been selected for his particular delivery service.

If any of the packages are found to be unsuitable for shipment in any way, the service person can open the second access door 40, and place the unsuitable packages in a space behind second service access opening 38 which has been reserved for reject packages. The operator of the system 10 can retrieve these packages periodically, and notify the customers by calling the phone number that the customer is required to enter. Once the delivery service person has completed withdrawal of the packages from the storage area 14, he closes and locks the first and second doors 36 and 40. He or she also slides the platform 88 to its retracted position and closes the manifest access door and locks that door as well. A third option which is presented in the delivery service control screen is the option to reject packages. The delivery service person records the numbers of the packages which have been placed in the second service access opening 38. The delivery service person then selects the option to reject packages on the main option screen, and a second screen is generated to request the numbers of the packages that have been rejected. The service person then enters the number of the first package that is to be rejected.

The system 100 stores the number of the rejected package in the memory within CPU 102, and then displays a screen asking whether additional packages are to be rejected. The process is repeated until all the rejected packages are loaded into the memory of CPU 102.

The fourth option that is presented in the screen for the delivery service person is the option to print the final manifest. The final manifest is a listing of all transactions which pertain to the particular commercial delivery service. If this option is selected, the manifest printer will print such a summary, and a screen will appear on terminal 24 asking the delivery person whether the manifest printed satisfactorily. If the answer is negative, a screen will appear asking the delivery service person to align the paper and make sure the printer is on line. The system 100 will then try to reprint the final manifest. Once the delivery service person indicates that the manifest printed in a satisfactory manner, the original four options will appear on the screen 24.

Figure 6:
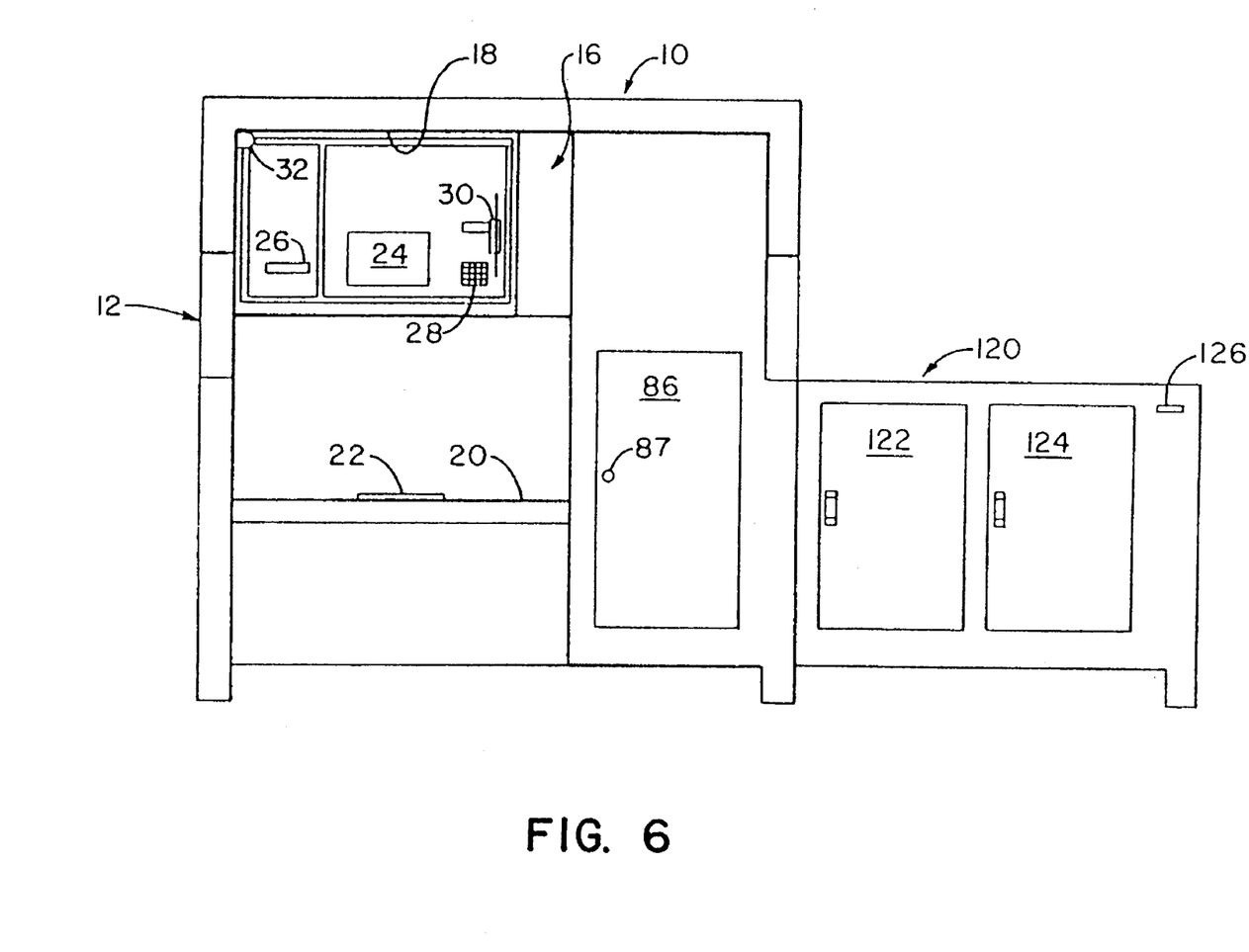
FIG. 6 is a front elevational view of a system constructed according to a second embodiment of the invention.

A second embodiment of the invention is illustrated in FIG. 6 of the drawings. In this embodiment, an adjunct packaging supply unit 120 is positioned to one side of the system 10. Packaging supply unit 120 includes a first door 122, a second door 124 and a tape dispenser slot 126. The first and second doors 122, 124 can be opened to access packaging materials such as wrapping material, heavy tape, or writing implements. The dispensing of material through the doors 122, 124 and through the tape dispenser 126 may further be controlled and coordinated through the control system 100.

Referring now to FIGS. 7–10, a system 210 constructed according to a third, preferred, embodiment of the invention includes an outer housing 212 having an inner surface 216 and an outer surface 214. Except as specifically described herein, system 210 is identical to the system described above in reference to the first embodiment of the invention.

Figure 7:
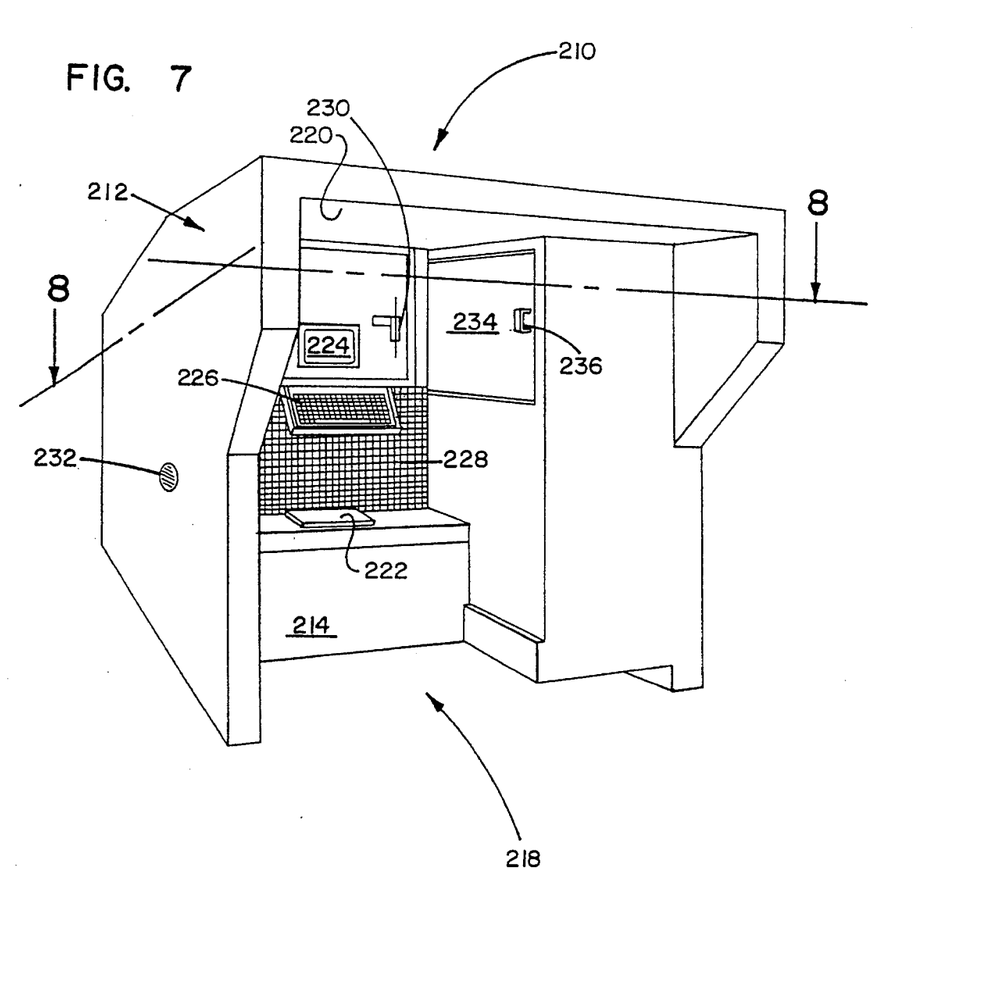
FIG. 7 is a perspective view of a system constructed according to a third preferred embodiment of the invention.

As may best be seen in FIG. 7, a customer interface area 218 includes a hooded overhang 220 for sheltering a customer from bad weather such as rain or snow. An electronic scale 222, a CRT 224 and a keyboard 226 are provided beneath the hooded overhang 220. A grid of evenly spaced lines 228 is provided on a surface of the customer interface area 218 beneath the keyboard 226 and above the scale 222 to assist a customer in measuring a parcel which is intended to be posted. A magnetic card reader 230 is also positioned in the customer interface area 218 beneath hooded overhang 220, as is shown in FIG. 7. A ventilation opening 232 is defined in the outer housing 212 of the system 210, as may be seen in FIG. 7.

Figure 8:
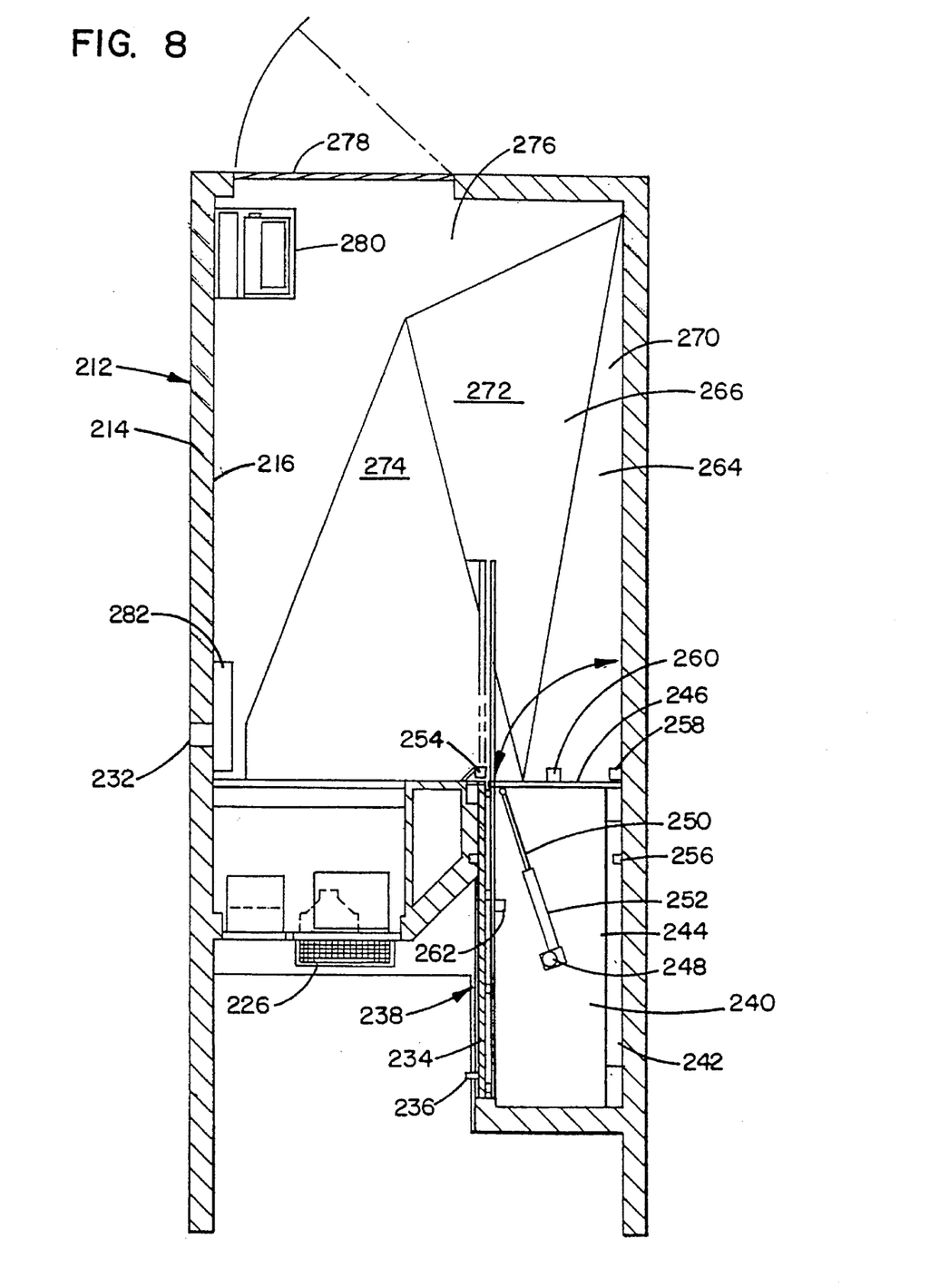
FIG. 8 is a top sectional view of a system constructed according to the embodiment depicted in FIG. 7.

Looking now to FIGS. 7 and 8, an improved security deposit system 238 includes a sliding outer door 234 having a handle 236 which is positioned for gripping by a customer within the customer interface area 218 beneath hooded overhang 220. Improved security deposit system 238 utilizes a temporary holding space 240 which is partially defined by sliding outer door 234 and a hinged inner door 246. Hinged inner door 246 is arranged to be actuated by a door moving assembly consisting of a stepper motor 248, and an extendable member 250 which is pivotally mounted to inner door 246 at one end thereof and is telescopingly received within a casing 252 at a second end thereof.

Stepper motor 248 is itself mounted to outer housing 212 by a pivotal mounting assembly. When stepper motor 248 turns in a first direction, a rack and pinon arrangement causes extendable member 250 to extend from casing 252, thus opening the inner door 246. When stepper motor 248 turns in a second, opposite direction, extendable member 250 retracts within casing 252, thus closing the inner door 246.

Figure 9:
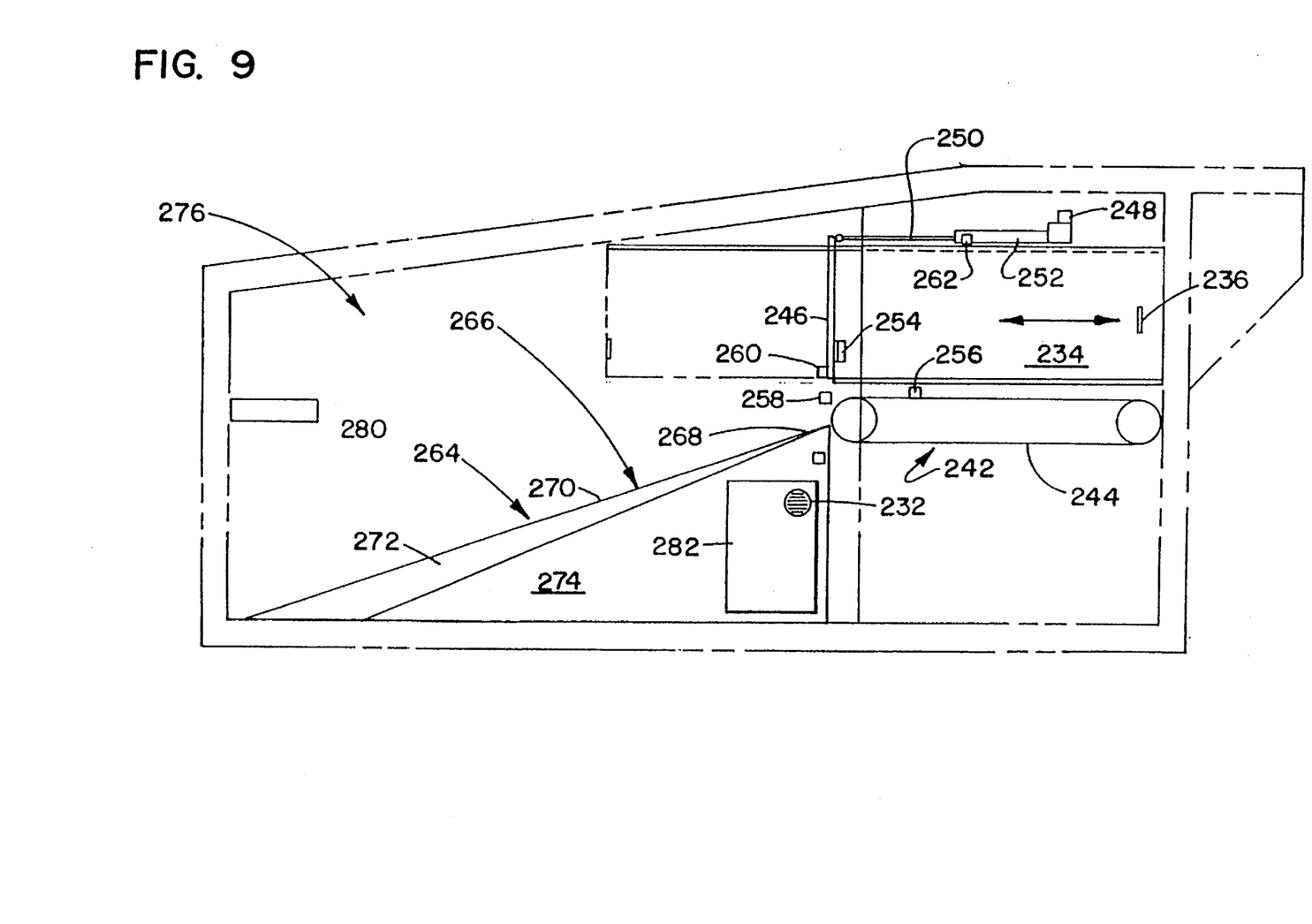
FIG. 9 is a diagrammatical side sectional view of a system constructed according to the embodiment depicted in FIGS. 7 and 8.
Figure 10:
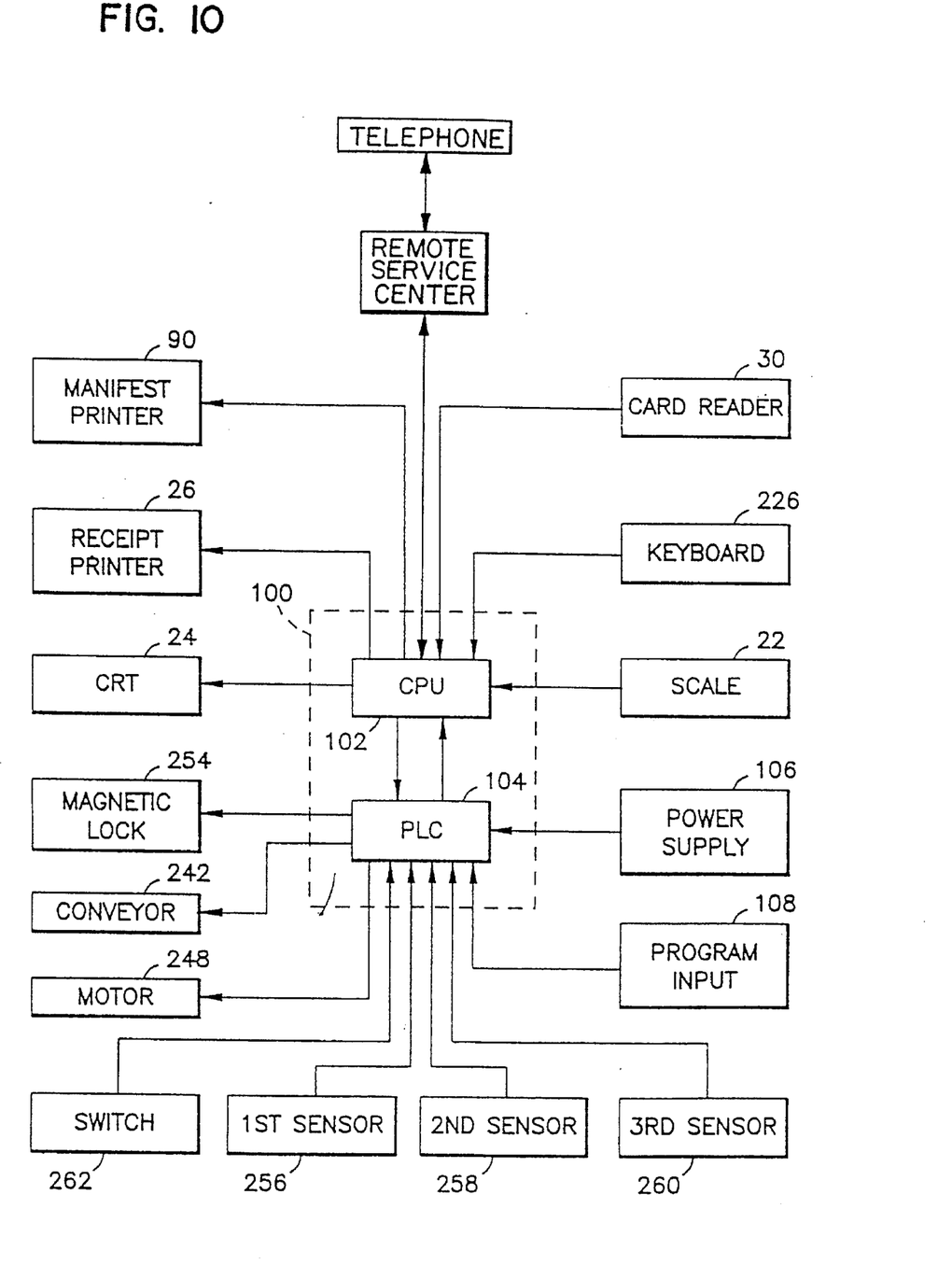
FIG. 10 is a schematic view of a control system for the embodiment of the invention illustrated in FIGS. 7–9.

As is perhaps best illustrated in FIGS. 8 and 9, sliding outer door 234 is mounted within bearing tracks so as to be slidable between a first closed position, as is illustrated in FIG. 7, and second, open retracted position, as is shown in dashed lines in FIGS. 8 and 9. Sliding door 234 may be locked in its closed position by a magnetic lock 254, which is illustrated in FIG. 8.

As may be seen in FIGS. 8 and 9, a powered conveyer 242 is mounted within system 210 such that an upper run of a conveyer belt 244 thereof defines the bottom surface of the temporary holding space 240. The purpose of powered conveyer 242 is to move a parcel placed within temporary holding space 240 by a customer to a passive parcel distribution device 264 within a storage area 276 defined within outer housing 211. A first photocell sensor 256 is mounted within temporary holding space 240 such that its detection beam will project parallel to the conveyer belt 244 a predetermined spaced distance above the conveyer belt 244. First photocell sensor 256 is thus positioned inside the inner door 246. A second photocell sensor 258 is positioned outside the inner door 246, and is also spaced a predetermined distance above the plane in which the upper run of conveyer belt 244 extends. A third photocell sensor 260 is mounted so that its detection beam will pass through the plane defined by the upper run of conveyer belt 244. The purpose of photocell sensors 256, 258, 260 will be described in greater detail below.

A mechanical switch 262 is mounted within temporary holding space 240 so that it is moved to a first position when sliding outer door 234 is moved to the retracted position from the open position, and such that it is moved to a second position when sliding outer door 234 is pulled from the retracted position back to the closed position depicted in FIG. 7. Preferably, switch 262 is actuated by door 234 when door 234 is very close to the closed position. The purpose of switch 262 will be described in greater detail below.

System 210 further includes a passive parcel distribution device 264 which is constructed and arranged to distribute parcels received from security deposit system 238 evenly throughout the storage area 276, so that the volume within storage area 276 is utilized more efficiently for storing the parcels than would otherwise be possible. In one preferred embodiment, passive parcel distribution device 264 may include a ramp 266. The ramp 266 may serve to transport the parcel from the first zone, e.g. holding space 240, where the parcel is initially placed and the secure zone, where the parcel is stored until it is picked up.

The ramp 266 may serve to secure the second zone. The ramp 266 may have an upper end 268 which is positioned adjacent to the exit end of the temporary holding space 240. Ramp 266 includes a first slide surface 270, a second slide surface 272, and a third slide surface 274. Slide surfaces 270, 272, 274 are preferably fabricated from a non-corrosive, low friction material and are shaped so that their surfaces converge at the upper end 268 of ramp 266. In the illustrated embodiment, first slide surface 270 is shaped so as to extend along one longitudinal portion of inner surface 216, and gradually increases in width toward the upper end 268 of ramp 266. Second slide surface 272 has a triangular shape, and tapers so as to gradually decrease in width toward the upper end 268 of ramp 266. Third slide surface 274 is shaped so as to also decrease in width toward the upper end 268 of ramp 266. Slide surfaces 270, 272, and 274 are all positioned so as to slope downwardly in different planes, thereby causing a parcel sliding on first slide surface 270 to be directed to a different portion of storage area 276 then one on second slide surface 272 or third slide surface 274.

Likewise, a parcel on second slide surface 272 will be directed to a different portion of storage area 276 than a parcel on third slide surface 274. As parcels begin to fill the storage area 276, the respective lower portions of slide surfaces 270, 272, 274 may begin to be impeded by the accumulated parcels. In such an event, parcels will continue to collect along the respective surfaces 270, 272, 274 until they are removed from the storage area 276. By so distributing the parcels evenly throughout the storage area 276, the passive parcel distribution device 264 utilizes space within the storage area 276 more efficiently than heretofore thought possible.

As perhaps is shown best in FIG. 8, access is gained to storage area 276 via a door 278. Door 278 is preferably secured by a combination or code type lock, which can be opened by authorized personnel or representatives of a commercial delivery service. System 210 also includes a manifest printer 280, which is mounted on a pedestal within a corner of storage area 276 which is distal from the upper end 268 of ramp 266. Manifest printer 280 performs the same function as the manifest printer described with reference to the previously described embodiment.

According to one important aspect of the invention, system 210 is provided with a climate control unit 282 which is in communication with the outside air through the ventilation opening 232. Climate control unit 282 is preferably a combined fan and heater unit. In warm weather, climate control 282 simply circulates outside air through the storage area 276 to keep heat and humidity within the storage area 276 to a minimum. When outside temperatures fall beneath a predetermined level, the heater element within climate control unit 282 is actuated, thus heating the storage area 276 to a predetermined minimum temperature. Preferably, outer housing 212 is fabricated from an insulating material. Most preferably outer housing 212 is fabricated from a metallic inner wall, a metallic outer wall and insulative material between the inner and outer walls.

Alternatively, climate control unit 282 may further incorporate an air conditioner unit for keeping the temperature within storage area 276 at a predetermined temperature and humidity of the outside air. This is preferably accomplished by incorporating a heat pump into climate control unit 282, which can provide heating of the storage area 276 during cold periods, and cooling of the storage area 276 during warmer, more humid periods. Climate control unit 282, together with the hooded overhang 220, makes system 210 convenient and safe to use in outdoor, unsheltered application sites.

The operation of system 210 is identical to that described above with reference to the first embodiment of the invention, except as described otherwise below.

First, a customer approaches the customer interface area 218 and measures the dimensions of the item being shipped on the indicia 228 which is provided adjacent to the platform. In response to inquiries made to the CRT 224, the customer enters complete addressing information through the keyboard 226. After any inquiry procedure which is identical to that described above with reference to the first embodiment of the invention, a printer (not shown) prints out an address label which the customer applies to the parcel. Once this process is complete, the PLC 104, schematically depicted in FIG. 10, deactivates magnetic lock 254. The customer is then instructed on the CRT 224 to open the outer sliding door 234. The customer then slides the outer door 234 to the left and places the parcel (or letter) on the upper run of the conveyor belt 244. When sliding door 234 is sufficiently open, switch 110 is actuated, and the CRT screen is modified to instruct the customer to again close the sliding door 234. When the customer closes the sliding door 234, switch 110 is again actuated, causing the PLC 104 to activate the conveyer 242 for a predetermined length of time.

If the customer is mailing a thin letter, first photocell sensor 252 will not detect that letter, since the first photocell sensor 256 is mounted a predetermined distance above the plane in which the upper run of the conveyor belt 244 is positioned. Then, the letter travels on conveyor belt 244 and is propelled beneath the lower surface of the inner door 246 directly onto the ramp 266. At this point, the letter will be detected by the third photocell 260, and the PLC will reactivate magnetic lock 254. Alternatively, the second photocell sensor 258 can be positioned to detect a letter at this point, in addition to its package detection capabilities. In this case, the third photocell sensor 260 is not necessary. The letter will then travel down one of the slide surfaces 270, 272, 274 of ramp 266, depending upon the size and center of mass of the envelope, and the lateral positioning of that envelope upon the conveyor belt 244 by the customer.

If it is a parcel being posted by the customer, that parcel will be detected by the first photocell sensor 256 as it travels toward the storage area 276 within the temporary holding space 240 on conveyor belt 244. Once PLC 104 learns that first photocell sensor 256 has been actuated, PLC 104 instructs stepper motor 248 to open inner door 246. At this point, PLC 104 also reactivates magnetic lock 254. As the parcel advances, it will also be detected by second photocell sensor 258. During the period of detection, no action is taken. When the parcel advances to the extent that it no longer activates the second photo cell sensor 258, PLC 104 instructs stepper motor 248 to close the inner door 246. As the parcel moves forward at this point, it may contact the surface of the inner door 246, and be deflected somewhat to the left as viewed in FIG. 8. At this point, the parcel will be directed down one of the different slide surfaces 270, 272, 274 of the ramp 266. The redirecting effect created by the inner door 246, together with the divergent slide surfaces, tend to evenly distribute parcels within the storage space.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A system for accepting and storing items for subsequent pickup by a commercial carrier, comprising:

an outer housing;

means for weighing an item which a customer may intend to ship;

means for inputting information relating to the destination of the item from customer;

control means for calculating a shipment fee for the item, said control means being in communication with said weighing means and said information inputting means;

means in communication with said control means, for accepting identification information relating to eventual payment from the customer, said communication means comprising means for receiving and reading a credit card, means for communicating the charges information to a central location for billing the charges to said customer;

a storage area defined by said outer housing; and secure deposit means for permitting a customer to securely deposit the item into the storage area, said secure deposit means including a first zone which serves as a holding space when said item is first placed in the storage area and a secure zone into which the item is moved for secure storage.

2. The system of claim 1 wherein said system includes means for supplying voice instructions for operation of said system.

3. The system of claim 1 wherein said means for communicating comprise a card reader supported in said outer housing and a telephone line connected to said card reader at one end and a credit card service center at the other end.

4. The system of claim 3 wherein said means for communication further includes a telephone receiver whereby the customer may orally communicate with a service center.

5. The system of claim 4 wherein said outer housing includes means for measuring the item size and inputting such size into said control means for use in calculating the shipping charge.

6. The system of claim 4 wherein said outer housing comprises an enviromentally controlled outer housing.

7. An integrated, automated, unattended unit for collecting and securely holding items for collection and shipment by commercial delivery services: said automated unit comprising, means for weighing the item to be shipped;

means for inputting information relating to the destination to which the item is to be shipped;

control means for analyzing the inputted information and calculating the fee for shipment of the item; said control means further including means for receiving credit card information and means for communicating and assessing the shipment fee to the account of the person owning the credit card, said means for communicating the shipment fee being by telephone lines;

means for securely storing said item until the item is collected by said commercial delivery service;

means for storing the inputted information once said item is disposed in said secured storage means, said information storage means including means for displaying a manifest.

8. The integrated, automated, unattended unit of claim 7 including means for printing a hard copy of said manifest.

9. The integrated, automated, unattended unit of claim 7 wherein said means for storing said information further includes means for communicating said information to a remote location staffed by a human operator.

10. The integrated, automated, unattended unit of claim 9 wherein said unit includes a pivotable door that serves as a slide when said door is opened, said slide serving to transport the item to a storage area for secure storage.

11. The integrated, automated, unattended unit of claim 10 wherein said door serves to secure said storage area when said door is opened.

12. The integrated, automated, unattended unit of claim 7 wherein said means for receiving said credit card information comprises a magnetic card reader.

13. The integrated, automated, unattended unit of claim 12 wherein said unit includes a ramp, said ramp serving to transport the item from a first zone which serves as a holding space when said item is first placed in the storage area to a zone into which the item is moved for secure storage.

14. The integrated, automated, unattended unit of claim 13 wherein said ramp serves to secure said second zone.

15. The integrated, automated, unattended unit of claim 12 wherein said card reader is adapted to read credit cards issued by any of a plurality of credit card companies and wherein said fee communicating means is adapted to communicate selectively with the credit card company issuing the card being used in the transaction.

16. The integrated, automated, unattended unit of claim 15 wherein said fee communicating means includes means for validating said credit card prior to issuing the shipping label.

17. The integrated, automated, unattended unit of claim 16 wherein said validating means includes means for determining the type of card and the expiration date of the card.

18. The integrated, automated, unattended unit of claim 17 wherein said validating means further includes means for determining whether the card is listed as a bad card.

19. An integrated, automated, unattended unit for collecting and securely holding items for collection and shipment by commercial delivery services: said automated unit comprising, means for weighing the item to be shipped;

means for inputting information relating to the destination to which the item is to be shipped;

control means for analyzing the inputted information and calculating the fee for shipment of the item; said control means further including means for communicating and assessing the shipment fee to the account of the person, said means for communicating the shipment fee being by telephone lines;

means for securely storing said item until the item is collected by said commercial delivery service;

means for storing the inputted information once said item is disposed in said secured storage means, said information storage means including means for transmitting a manifest to a remote location.

20. The integrated, automated, unattended unit of claim 19 wherein said fee communicating means includes means for validating said account prior to issuing the shipping label.

21. The integrated, automated, unattended unit of claim 19 including means for printing a hard copy of said account charge for said person.

22. A system for accepting and storing items for subsequent pickup by a commercial carrier, comprising:

means for weighing an item which a customer may intend to ship, said weighing means being supported by said outer housing;

means for inputting information relating to the destination of the item from customer;

control means for calculating a shipment fee for the item, said control means being in communication with said weighing means and said information inputting means;

means in communication with said control means, for accepting identification information relating to eventual payment from the customer;

a storage area; and secure deposit means for permitting a customer to securely deposit the item into the storage area, said secure deposit means including a first zone which serves as a holding space when said item is first placed in the storage area and a secure zone into which the item is moved for secure storage, and ramp means for moving said item from said holding space to said secure zone.

23. The system of claim 22 wherein said means for weighing comprises a portion of said conveyor means.

24. A system for accepting and storing items for subsequent pickup by a commercial carrier, comprising:

means for weighing an item which a customer may intend to ship;

means for inputting information relating to the destination of the item from customer;

control means for calculating a shipment fee for the item, said control means being in communication with said weighing means and said information inputting means;

means in communication with said control means, for accepting identification information relating to eventual payment from the customer, said communication means comprising means for communicating the charges information to a central location for billing the charges to said customer;

a storage area; and secure deposit means for permitting a customer to securely deposit the item into the storage area, said secure deposit means including a first zone which serves as a holding space when said item is first placed in the storage area and a secure zone into which the item is moved for secure storage and means for conveying said item from said holding space to said storage area.

25. A system for accepting and storing items for subsequent pickup by a commercial carrier, comprising:

means for weighing an item which a customer may intend to ship, said weighing means being supported by said system;

means for inputting information relating to the destination of the item from customer;

control means for calculating a shipment fee for the item, said control means being in communication with said weighing means and said information inputting means;

means in communication with said control means, for accepting identification information relating to eventual payment from the customer, said communication means comprising means for communicating the charges information to a central location for billing the charges to said customer;

a storage area; and secure deposit means for permitting a customer to securely deposit the item into the storage area, said secure deposit means including a first zone which serves as a holding space when said item is first placed in the storage area and a secure zone into which the item is moved for secure storage.

26. The system of claim 25 wherein said means for communicating comprise a card reader and a telephone line connected to said card reader at one end and a credit card service center at the other end.

27. The system of claim 25 wherein said means for communication further includes a telephone receiver whereby the customer may orally communicate with a service center.

28. An integrated, automated, unattended unit for collecting and securely holding items for collection and shipment by commercial delivery services: said automated unit comprising, means for weighing the item to be shipped;

means for inputting information relating to the destination to which the item is to be shipped;

control means for analyzing the inputted information and calculating the fee for shipment of the item; said control means further including means for communicating and assessing the shipment fee to the account of the person, said means assessing comprising means for printing a hard copy of said account charge for said person;

means for securely storing said item until the item is collected by said commercial delivery service;

means for storing the inputted information once said item is disposed in said secured storage means, said information storage means including means for displaying a manifest.

29. The integrated, automated, unattended unit of claim 28 wherein said fee communicating means includes means for validating said account prior to issuing the shipping label.

30. The integrated, automated, unattended unit of claim 28 including means for communicating said account charge to a remote location.

31. An integrated, automated, unattended unit for collecting and securely holding items for collection and shipment by commercial delivery services: said automated unit comprising, means for weighing the item to be shipped;

means for inputting information relating to the destination to which the item is to be shipped;

control means for analyzing the inputted information and calculating the fee for shipment of the item; said control means further including means for receiving credit card information and means for communicating and assessing the shipment fee to the account of the person owning the credit card;

means for securely storing said item until the item is collected by said commercial delivery service, said means for securely storing including a pivotable door that serves as a slide when said door is opened, said slide serving to transport the item to a storage area for secure storage, said door serving to secure said storage area when said door is opened, said means for securely storing further including a baffle cooperating with said opened pivotable door to secure said storage area;

means for storing the inputted information once said item is disposed in said secured storage means.

32. The integrated, automated, unattended unit of claim 31 wherein said weighing means comprises a portion of said pivotable door.

33. The integrated, automated, unattended unit of claim 31 wherein said unit includes means for measuring the item size and inputting such size into said control means for use in calculating the shipping charge.

34. An integrated, automated, unattended unit for collecting and securely holding items for collection and shipment by commercial delivery services: said automated unit comprising, means for inputting information relating to the destination to which the item is to be shipped;

control means for analyzing the inputted information and calculating the fee for shipment of the item; said control means further including means for communicating and assessing the shipment fee to the account of the person, said means for communicating the shipment fee being by telephone lines;

means for securely storing said item until the item is collected by said commercial delivery service;

means for storing the inputted information once said item is disposed in said secured storage means, said information storage means including means for transmitting information that may be used to prepare a manifest to a remote location.

* * * * *